(12) United States Patent
Chan et al.

(10) Patent No.: US 7,279,134 B2
(45) Date of Patent: Oct. 9, 2007

(54) MICROFLUIDIC DEVICES WITH POROUS MEMBRANES FOR MOLECULAR SIEVING, METERING, AND SEPARATIONS

(75) Inventors: Selena Chan, Sunnyvale, CA (US); Narayan Sundararajan, San Francisco, CA (US); Andrew A. Berlin, San Jose, CA (US); Mineo Yamakawa, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 10/246,049

(22) Filed: Sep. 17, 2002

(65) Prior Publication Data

US 2004/0053422 A1 Mar. 18, 2004

(51) Int. Cl.
*B01L 3/02* (2006.01)
*B31D 3/00* (2006.01)

(52) U.S. Cl. .................... 422/100; 422/101; 422/68.1; 422/88; 436/180; 216/56; 216/335

(58) Field of Classification Search .......... 422/99–101, 422/68.1, 69, 88, 102, 104; 436/174, 178, 436/177, 180; 216/56; 210/321.75, 321.84, 210/335, 500.26
See application file for complete search history.

(56) References Cited

U.S. PATENT DOCUMENTS

| | | | | |
|---|---|---|---|---|
| 4,797,211 A * | 1/1989 | Ehrfeld et al. ......... 210/321.84 |
| 5,070,899 A * | 12/1991 | Matkovich et al. ......... 137/455 |
| 5,185,086 A * | 2/1993 | Kaali et al. ................ 210/748 |
| 5,716,533 A * | 2/1998 | O'Neill et al. ............... 216/27 |
| 5,961,932 A | 10/1999 | Ghosh et al. ............... 422/193 |
| 5,976,472 A * | 11/1999 | Chatterjee et al. .......... 422/130 |
| 5,985,164 A * | 11/1999 | Chu et al. ..................... 216/41 |
| 6,036,927 A * | 3/2000 | Chatterjee et al. .......... 422/211 |
| 6,040,193 A * | 3/2000 | Winkler et al. ............. 436/180 |
| 6,602,414 B2 * | 8/2003 | Warner .................. 210/321.75 |
| 6,627,406 B1 * | 9/2003 | Singh et al. ................. 435/7.1 |
| 6,663,833 B1 * | 12/2003 | Stave et al. ................... 422/81 |
| 6,673,628 B2 * | 1/2004 | Freitag et al. .............. 436/514 |
| 6,734,447 B2 * | 5/2004 | Li ......................... 250/492.21 |
| 6,806,543 B2 * | 10/2004 | Yamakawa et al. ......... 257/414 |
| 6,960,235 B2 * | 11/2005 | Morse et al. .............. 48/127.9 |
| 2002/0045246 A1 | 4/2002 | McMillan et al. .......... 435/306 |
| 2002/0098122 A1 * | 7/2002 | Singh et al. ................ 422/100 |
| 2002/0127740 A1 * | 9/2002 | Ho ............................. 436/518 |
| 2003/0086436 A1 * | 5/2003 | Sorbara et al. ............. 370/442 |
| 2003/0102284 A1 * | 6/2003 | Schmidt et al. ............... 216/13 |

(Continued)

*Primary Examiner*—Brian R. Gordon
(74) *Attorney, Agent, or Firm*—Darby & Darby, P.C.

(57) ABSTRACT

Microfluidic devices with porous membranes for molecular sieving, metering, and separation of analyte fluids. In one aspect, a microfluidic device includes a substrate having input and output microfluidic channel sections separated by a porous membrane formed integral to the substrate. In another aspect, the porous membrane may comprise a thin membrane that is sandwiched between upper and lower substrate members. The microfluidic device may include one or a plurality of porous membranes. In one embodiment, a plurality of porous membranes having increasingly smaller pores are disposed along portions of a microfluidic channel. In another embodiment, a cascading series of upper and lower channels are employed, wherein each upper/lower channel interface is separated by a respective porous membrane. In another aspect, a porous membrane is rotatably coupled to a substrate within a microfluidic channel via a MEMS actuator to enable the porous membrane to be positioned in filtering and pass-through positions.

13 Claims, 10 Drawing Sheets

U.S. PATENT DOCUMENTS

| | | | |
|---|---|---|---|
| 2003/0175947 A1* | 9/2003 | Liu et al. | 435/288.5 |
| 2003/0222012 A1* | 12/2003 | Lee et al. | 210/321.84 |
| 2003/0223913 A1* | 12/2003 | Karp et al. | 422/101 |
| 2004/0018116 A1* | 1/2004 | Desmond et al. | 422/58 |
| 2004/0028567 A1* | 2/2004 | Parce et al. | 422/100 |
| 2004/0037739 A1* | 2/2004 | McNeely et al. | 422/58 |
| 2004/0126279 A1* | 7/2004 | Renzi et al. | 422/100 |
| 2004/0219072 A1* | 11/2004 | Yamakawa et al. | 422/100 |
| 2004/0258571 A1* | 12/2004 | Lee et al. | 422/100 |
| 2004/0259237 A1* | 12/2004 | Kellogg et al. | 435/287.1 |
| 2005/0129580 A1* | 6/2005 | Swinehart et al. | 422/100 |
| 2005/0214737 A1* | 9/2005 | Dejneka et al. | 435/4 |
| 2005/0250199 A1* | 11/2005 | Anderson et al. | 435/287.2 |

* cited by examiner

MICROFLUIDIC DEVICES WITH POROUS MEMBRANES FOR MOLECULAR SIEVING, METERING, AND SEPARATIONS

TECHNICAL FIELD

This disclosure relates generally to microfluidic devices, and more particularly, but not exclusively, to microfluidic devices having an integrated porous-silicon membrane for filtering molecular components of an influent stream to meter and/or separate chemical and/or biological molecules.

BACKGROUND INFORMATION

As the breadth of microchip fabrication technology has continued to expand, an emerging technology associated with miniscule gadgets known as microfluidic devices has taken shape. Microfluidic devices, often comprising miniaturized versions of reservoirs, pumps, valves, filters, mixers, reaction chambers, and a network of capillaries interconnecting the microscale components, are being developed to serve in a variety of deployment scenarios. For example, microfluidic devices may be designed to perform multiple reaction and analysis techniques in one micro-instrument by providing a capability to perform hundreds of operations (e.g. mixing, heating, separating) without manual intervention. In some cases, microfluidic devices may function as detectors for airborne toxins, rapid DNA analyzers for crime-scene investigators, and/or new pharmaceutical testers to expedite drug development.

While the applications of such microfluidic devices may be virtually boundless, the integration of some microscale components into microfluidic systems has been technically difficult, thereby limiting the range of functions that may be accomplished by a single device or combination of devices. In particular, current microfluidic systems have not adequately integrated a size-separating (or excluding) filter into a microfluidic chip. As such, separations may generally be carried out in external packed porous media or polymer-based nanopore membranes, thereby increasing contamination risks and introducing additional complexity and manual interaction into the performance of an analysis or other technique.

BRIEF DESCRIPTION OF THE VARIOUS VIEWS OF THE DRAWINGS

In the drawings, like reference numerals refer to like parts throughout the various views of the non-limiting and non-exhaustive embodiments of the present invention, and wherein.

DETAILED DESCRIPTION OF THE ILLUSTRATED EMBODIMENTS

Embodiments of a microfluidic device with an integrated porous-silicon membrane for molecular sieving, metering, and separations, and methods for fabricating and using the same are described in detail herein. In the following description, numerous specific details are provided, such as the identification of various system components, to provide a thorough understanding of embodiments of the invention. One skilled in the art will recognize, however, that embodiments of the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, embodiments of the invention provide a microfluidic device with at least one integrated porous-silicon membrane to sieve, meter, and/or separate molecular components from an influent stream introduced into the microfluidic device. Other features of the illustrated embodiments will be apparent to the reader from the foregoing and the appended claims, and as the detailed description and discussion is read in conjunction with the accompanying drawings.

With reference now to the drawings, and in particular to FIGS. 1*a-e*, wherein an embodiment of a microfluidic device 100 is illustrated. Microfluidic device 100 employs an integrated nanoporous membrane 102 that is disposed in a section of a microfluidic channel 104 formed in a substrate 106. The microfluidic channel 104 includes an input section 108 connected an influent reservoir 110 and an output section 112 connected to an effluent reservoir 114. In one embodiment, the device further includes a cover 116. Generally, cover 116 may include apertures via which fluid may be input and/or extracted, such as apertures 110A and 114A.

Optionally, the cover may be made of a material that is easily punctured for input or extraction of fluid via a syringe or the like.

As discussed herein, the porous membranes of the various embodiments comprise a porous structure that may be used for filtering, metering, and/or separating chemical and/or biological molecules. In general, the porous membrane may be manufactured such that its porosity is greatest along a selected direction. Furthermore, through the manufacturing processes described below, the pore sizes can be tuned from a few nanometers to micrometers, thereby enabling the filtration, metering and separation of targeted chemical and biological molecules.

An embodiment of a "stacked channel" microfluidic device 200 that employs a porous membrane 202 disposed between end portions of upper and lower channels 204 and 206 is shown in FIGS. 2a-e. In one implementation of the embodiment illustrated in FIGS. 2a-e, an influent fluid is input into an influent reservoir 210 and flows into upper channel 204. A portion of the influent fluid then passes through porous membrane 202 and flows into lower channel 206. The portion of the fluid passing through the porous membrane, comprising the effluent fluid, may then be collected in an effluent reservoir 214.

In one embodiment, microfluidic apparatus 200 comprises a three-part assembly, including an upper substrate member 220, and a lower substrate member 222, which are sandwiched around porous membrane 202. Generally, a recess may be formed in either the upper or lower substrate member to receive the porous membrane, such as a recess 224 formed in upper substrate member 220. Depending on the configuration of the reservoirs, portions of a given reservoir may be formed in the respective substrate members, such as depicted by portions 210A and 210B (corresponding to influent reservoir 210) and portions 214A and 214B (corresponding to effluent reservoir 214). In a manner similar to that described above for microfluidic device 100, microfluidic device 200 may also include a cover including reservoir apertures or made of a material suitable for use with a syringe or the like (not shown).

A microfluidic device 300 in which multiple integrated porous membranes are employed in shown in FIGS. 3a-3e. In the illustrated embodiment, microfluidic device 300 includes a serpentine channel 304 formed in a substrate 306. Generally, the input end of the channel may be connected to a storage means or supply source for the influent fluid, such as an influent reservoir (not shown) or an input port 330 via which the influent fluid is supplied. Similarly, the output end of the channel may be connected to a means for storing the effluent fluid (not shown), or may comprise an exit port 332 via which the effluent fluid may be collected via an effluent capture means.

Microfluidic device 300 employs a plurality of porous membranes that are disposed at various locations along channel 304, including porous membranes 302A, 302B, 302C, 302D, 302E, and 302F. In one embodiment, the pore size decreases with each porous membrane encountered by the fluid, thereby enabling separation of the analyte into various compounds. In another embodiment, the porosities of the porous membranes are substantially similar, providing more complete filtering of targeted molecules.

In general, microfluidic device 300 may be operated with or without a cover, such as cover 316. The cover may include apertures for accessing fluid contained in the various sections of the channel, or may comprise a material that may be easily pierced to enable access of such channel sections via syringes and the like.

A multi-layered stacked-channel microfluidic device 400 employing multiple porous membranes 402A, 402B, 402C, and 402D disposed between respective substrate layers 406A, 406B, 406C, 406D, and 406E is shown in FIGS. 4a-d. A plurality of stacked microfluidic channels are defined in the substrate layers such that (portions of) the analyte fluid flows through the porous membranes in a cascaded fashion, including upper microfluidic channels 404A, 404B, 404C, and 404D, and lower microfluidic channels 406A, 406B, 406C, and 406D. The device further includes a plurality of reservoirs 410A, 410B, 410C, 410D, and 410E disposed between the porous membranes in which separated portions of the fluid may be stored and accessed. As before, microfluidic device 400 may also include a cover (not shown), which may be required if the fluid volume is very small. Generally, the porous membranes may be disposed in recesses formed in a substrate layer connecting either an upper or lower microfluidic channel, such as recesses 424A, 424B, 424C, and 424D. As before, the porous membranes may have different porosities (for, e.g., finer and finer filtering) or similar porosities (for providing multiple filtering cycles within a single device).

A stacked-channel microfluidic device 500 employing upper and lower substrate members 520 and 522 rather than a plurality of substrate layers is shown in FIGS. 5a-e. It is noted that the various components and features in microfluidic devices 400 and 500 sharing common last two digits perform substantially similar functions in both embodiments.

Porous Membrane Manufacture and Characteristics

In accordance with one aspect of the invention, the porous membranes used herein comprise porous structures that may be used for filtering, metering, and/or separating chemical and/or biological molecules. In general, a porous membrane may be manufactured such that its porosity is greatest along a selected direction. Furthermore, through the manufacturing process described below, the pore sizes can be tuned from a few nanometers to micrometers, thereby enabling the filtration, metering and separation of targeted chemical and biological molecules.

In general, the porous membranes used for the integrated embodiments (i.e., microfluidic devices 100 and 300) will be made from the same material as the substrate. In the case of the stacked channel embodiments (i.e., microfluidic devices 200, 400, and 500), the porous membranes may generally be made from a wide-range of materials in which nano- and micro-porous structures may be formed, independent of the material used for the substrate layers or members. For example, such materials include but are not limited to single crystal porous silicon (PSi), porous polysilicon (PPSi), porous silica, zeolites, photoresists, porous crystals/aggregates, etc.

In one embodiment, porous silicon is used for the porous membrane. Porous silicon is a well-characterized material produced through galvanostatic, chemical, or photochemical etching procedures in the presence of HF (hydrofluoric acid) (A. G. Cullis et al., J. Appl. Phys. 1997, 82, 909.). Porous silicon can be made generally as complex, anisotropic nanocrystalline structure in silicon layers (cf., http://chem-faculty.ucsd.edu/sailor) by either electrochemical etching or stain etching to form porous silicon. The size and orientation of the pores can be controlled by the etching conditions (e.g., current density, etc.) and substrate type and its electrochemical properties (R. L. Smith, et al. "*Porous silicon formation mechanisms*", J. Appl. Phys., 1992, 71, R1; P. M. Fauchet, "*Pits and Pores: Formation, Properties, and Significance* for Advanced Luminescent Materials", P. Schmuki, et al., eds. Pennington, N.J.: *Electrochem. Soc.,* 1997, 27). Typical median pore sizes range from ~50 angstrom to ~10 µm with high aspect ratio (~250) pores in silicon maintained over a distance of several millimeters.

Another type of porous silicon can be formed by spark erosion (R. E. Hummel, et. al., "*On the origin of photoluminescence in spark-eroded (porous) silicon,*" *Appl. Phys. Lett.,* 1993, 63, 2771), resulting in an Si surface with pits and hills of various sizes in the micrometer to nanometers scale. Si nanostructures can be produced by an anisotopic etch followed by oxidation (A. G. Nassiopoulos, et al., "*Light emission form silicon nanostructures produced by conventional lithographic and reactive ion etching techniques,*" *Phys. Stat. Sol.* (B), 1995, 1990, 91; S. H. Zaidi, et al., "*Scalable fabrication and optical characterization of nm Si structures*", *In Proc. Symp. Mater. Res. Soc.,* 1995, 358, 957.). Though oxidizing a microcrystalline film deposited by chemical vapor deposition, Si crystallites are passivated by SiO to form nanocrystalline structures (H. Tamura, et al., "*Origin of the green/blue luminescence from nanocrystalline silicon,*" *Appl. Phys. Lett.,* 1994, 65, 92).

Figure 7:
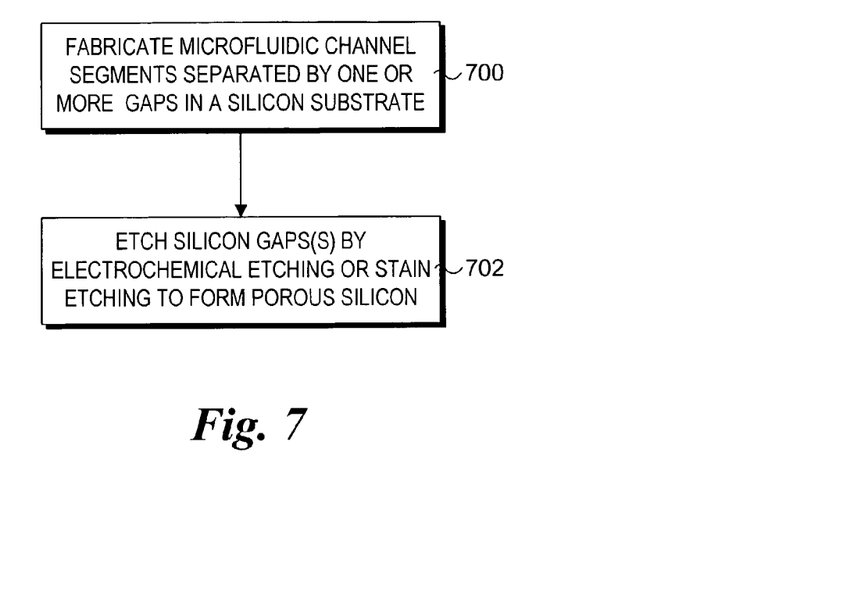
FIG. 7 is a flowchart illustrating operations performed in accordance with one embodiment of the invention to form integral porous silicon membranes within a microfluidic channel.

With reference to the flowchart of FIG. 7, the integrated porous membranes used in microfluidic devices 100 and 300 may be manufactured as follows. In a block 700, microfluidic channel segments separated by one or more respective gaps are fabricated in a silicon substrate, using standard microelectronics technology. The silicon gaps(s) is/are then etched in a block 702 by electrochemical etching or stain etching to form porous silicon. The size and orientation of the pores may be controlled by appropriate etching conditions (e.g., current density, etc.) and substrate type and resistivity.

Figure 8:
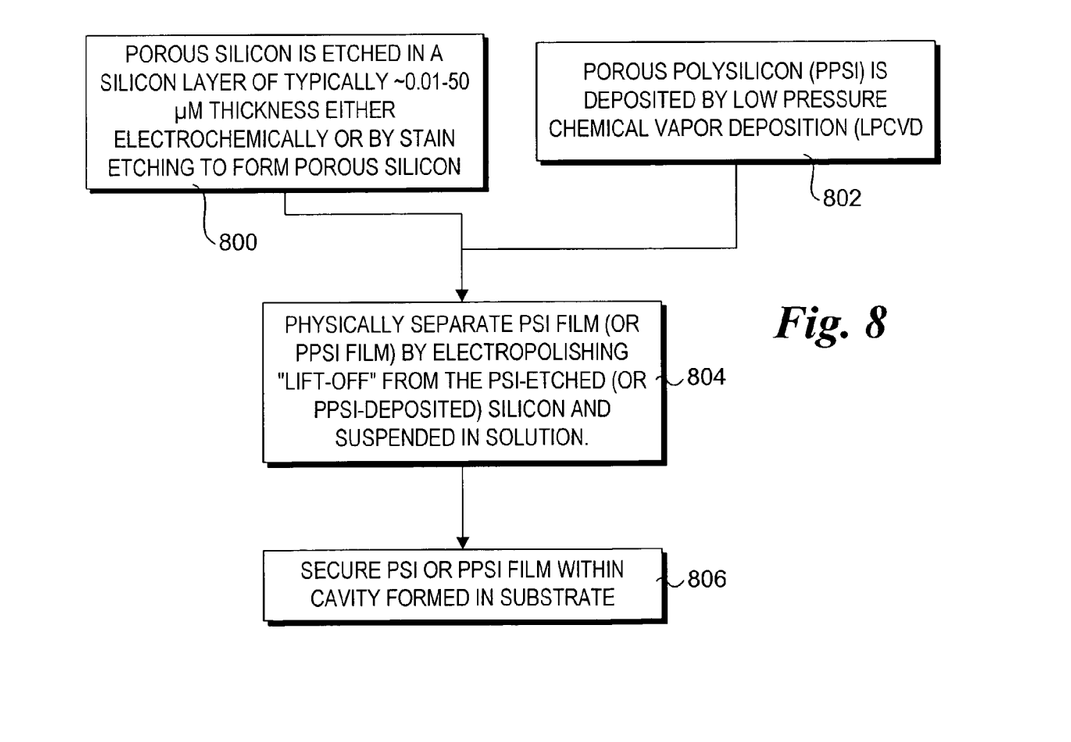
FIG. 8 is a flowchart illustrating operations that may be used to fabricate a porous membrane in accordance with one embodiment of the invention.

With reference to the flowchart of FIG. 8, a process for manufacturing porous membranes for the stacked-channel embodiments (e.g., porous membranes 212, 402, and 502) in accordance with one embodiment of the invention proceeds as follows. First, in a block 800, porous silicon is etched in a silicon layer of typically ~0.01-50 µm thickness either electrochemically or by stain etching to form porous silicon. In another embodiment, porous polysilicon (PPSi) is deposited by low pressure chemical vapor deposition (LPCVD), in accordance with a block 802. The size and orientation of the pores, porosity, grain size, thickness, etc., may be controlled via appropriate etching conditions (e.g., current density, current duration, etc.), deposition conditions (e.g., temperature, pressure, etc.), and also substrate type and its electrochemical properties, etc.

Next, in a block 804, a PSi film (or PPSi film) is physically separated by electropolishing "lift-off" from the PSi-etched or PPSi-deposited silicon and suspended in solution. Alternately, PPSi film may be formed when directly deposited on a substrate (e.g., silicon, quartz, etc.) and can be physically separated by any of various standard etching or micromachining techniques or kept as part of the original structure for immediate use of further etching, micromachining, etc. The PSi or PPSi film is then secured within a corresponding recess formed in a substrate half proximate to a cross-channel area in a block 806.

After manufacture, the porous membranes are assembled to be disposed within respective recesses in the upper or lower substrate members or substrate layers. In general, the substrates members and layers may be made from various substrate materials, including but not limited to crystalline substrates, such as silicon, and polymers. In one embodiment, the substrate material comprises polydimethyl siloxane (PDMS).

Dynamic Positioning of Porous Membranes Using MEMS Actuators

In accordance with one aspect of the invention, embodiments may be manufactured that employ a porous membrane that is disposed within a microfluidic channel and rotatably coupled to the substrate. For example, details of a channel corresponding to one such embodiment of a microfluidic device 600 is shown in FIGS. 6a-f. In the embodiment, a porous silicon membrane 602 is rotatably coupled to a substrate 606 in the base of a channel 604 via a MEMS (Micro-Electro-Mechanical Systems) hinge actuator 640. In one embodiment the device further employs an optional position-locking MEMS actuator 642 that is formed in the underside of a cover 616.

Figure 1A:
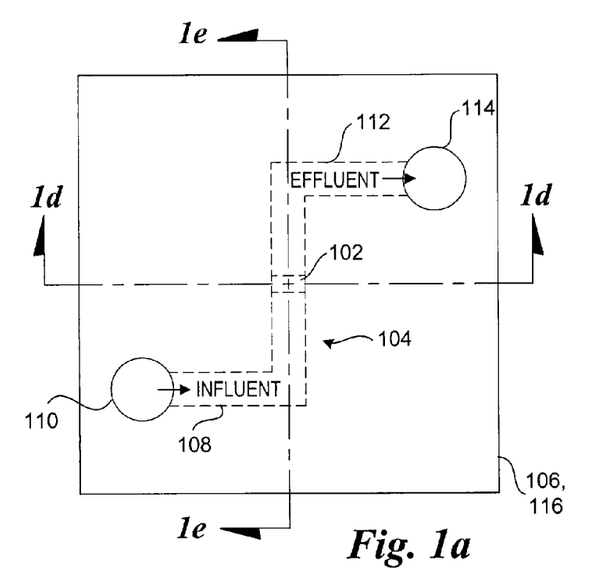
FIGS. 1*a-e* show various views of a microfluidic device in accordance with an embodiment of the invention in which a single porous silicon membrane is integrally formed from a substrate.
Figure 1B:
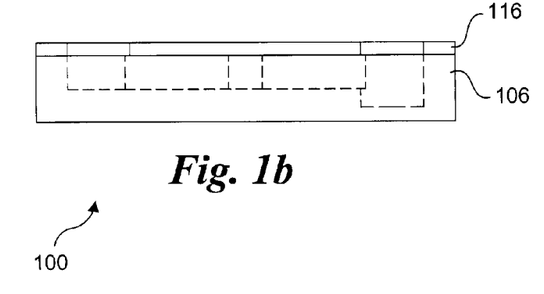
Figures 1C, 1D:
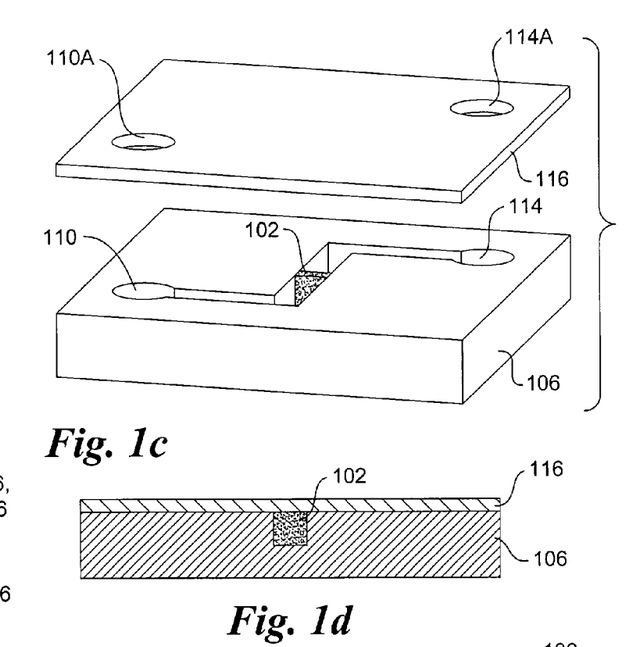
Figure 1E:
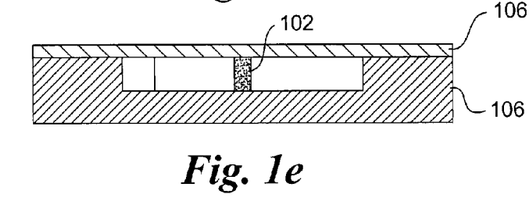
Figure 2A:
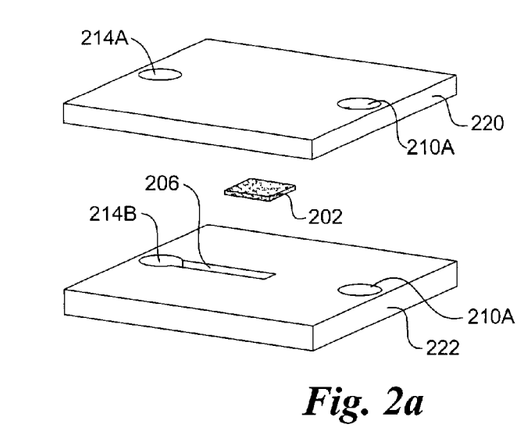
FIGS. 2*a-e* show various views of an embodiment of a microfluidic device that employs a stacked-channel configuration, wherein a porous membrane is disposed between end portions of an upper and lower microfluidic channel.
Figure 2B:
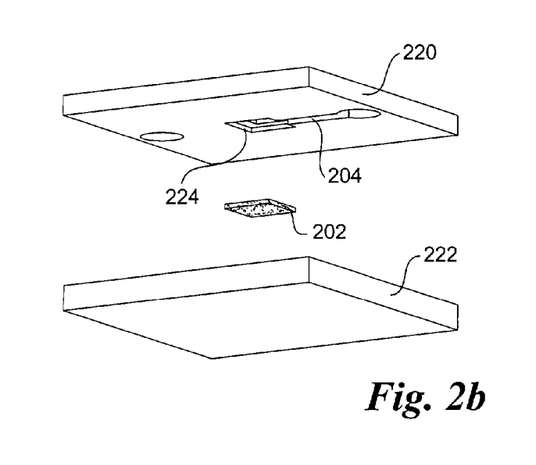
Figure 2C:
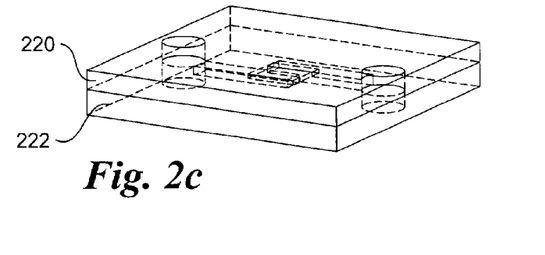
Figure 2D:
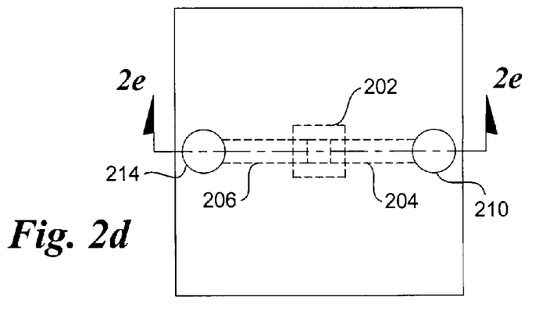
Figure 2E:
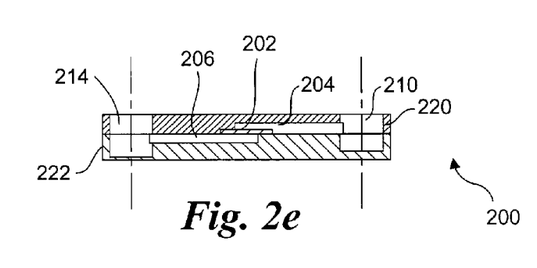
Figure 3A:
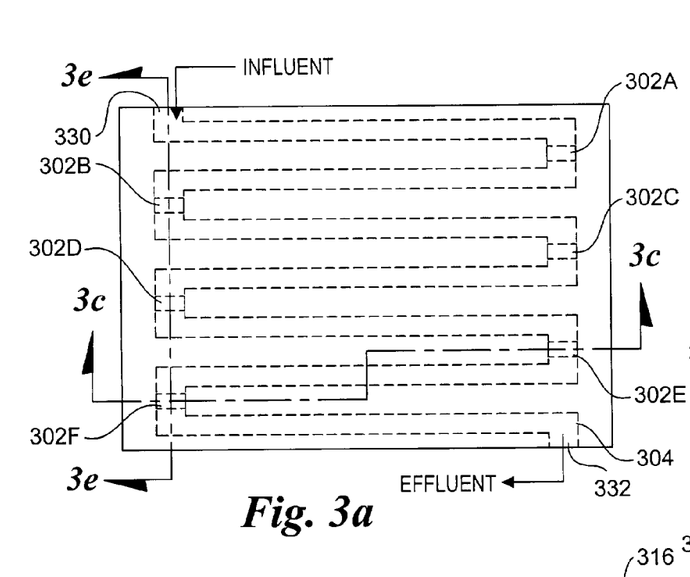
FIGS. 3*a-e* show various views of an embodiment of a microfluidic device in which a plurality of integral porous silicon membranes are disposed at various points along a microfluidic channel.
Figures 3B, 3C:
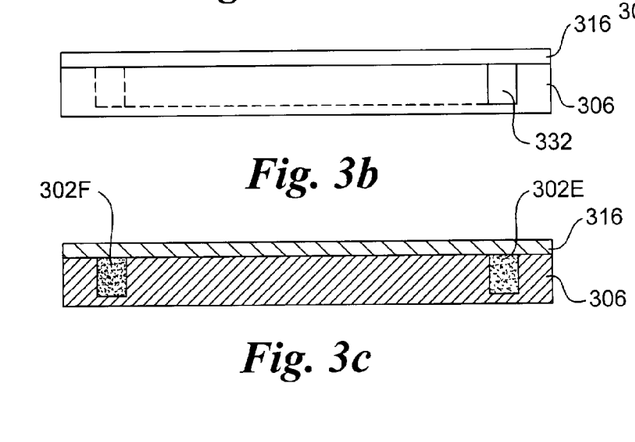
Figure 3D:
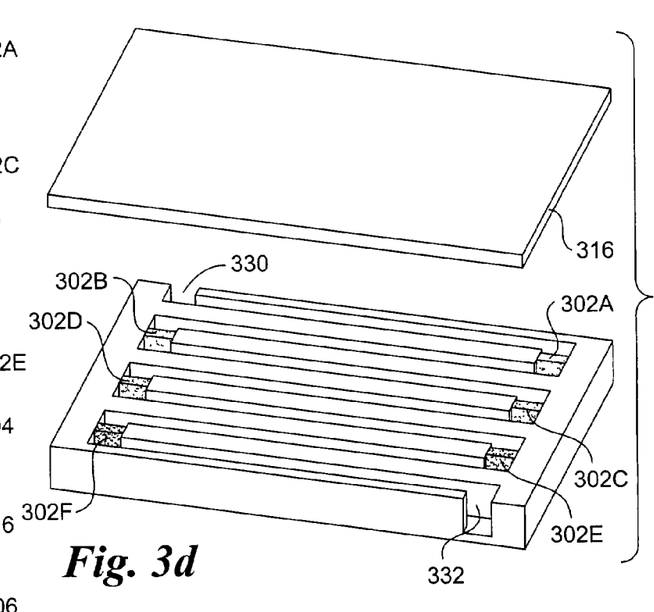
Figure 3E:
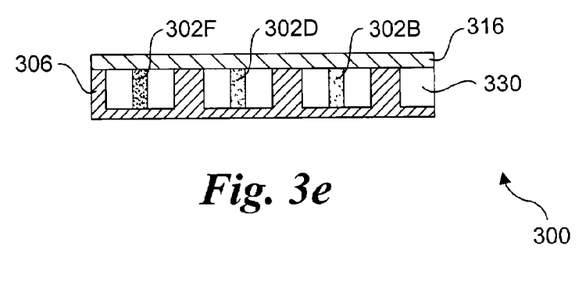
Figure 4A:
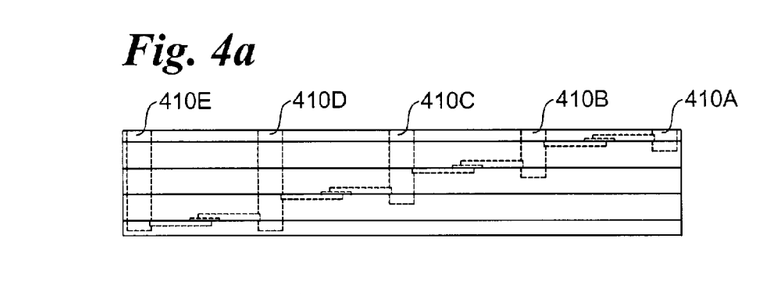
FIGS. 4*a-d* show various views of an embodiment of a microfluidic device having a cascading stacked-channel configuration, wherein the platform substrate comprising a plurality of substrate layers.
Figure 4B:
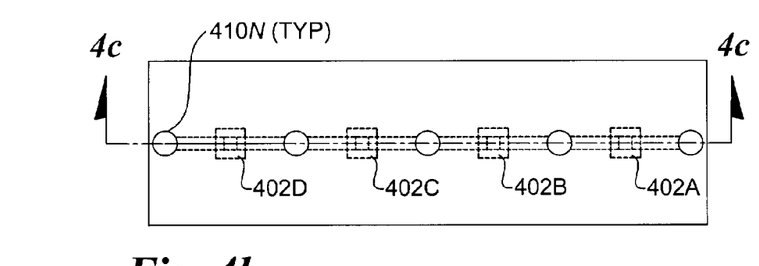
Figure 4C:
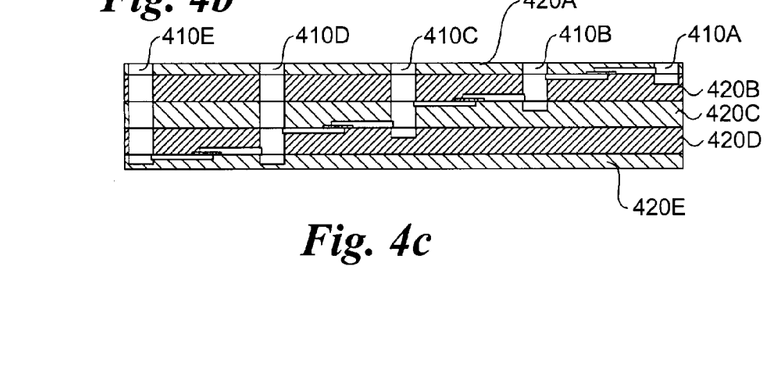
Figure 4D:
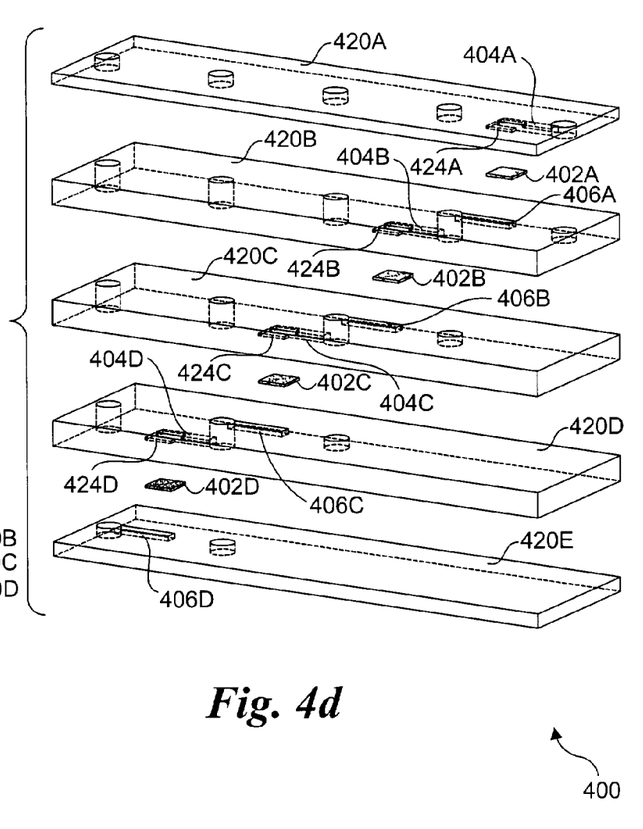
Figure 5A:
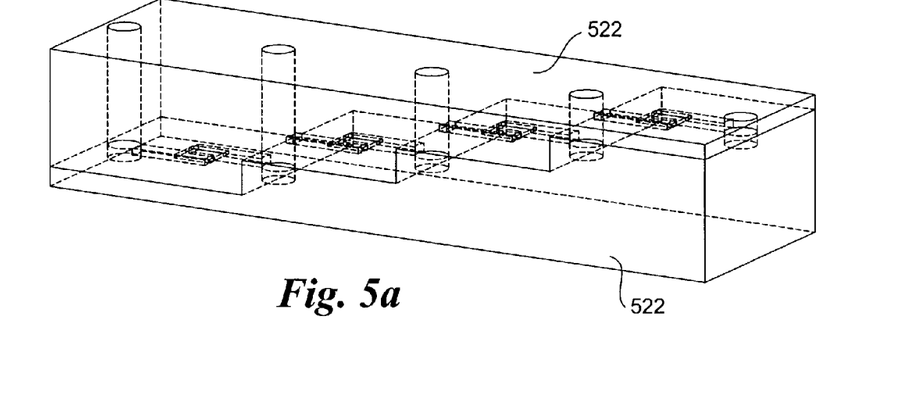
FIGS. 5*a-e* show various views of an embodiment of a microfluidic device having a cascading stacked-channel configuration, wherein the platform substrate comprises upper and lower substrate members.
Figure 5B:
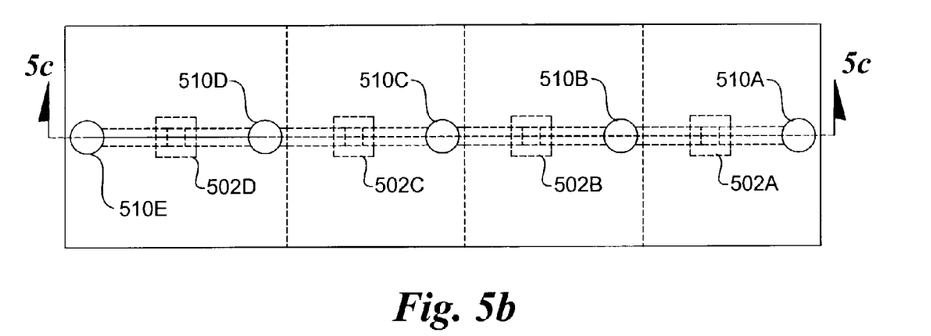
Figure 5C:
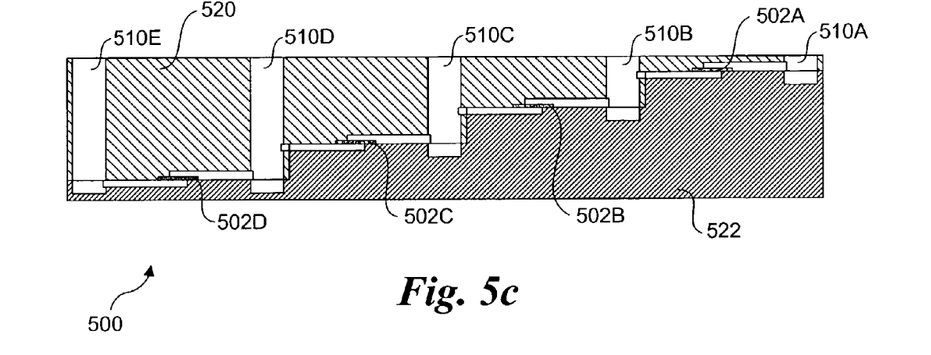
Figure 5D:
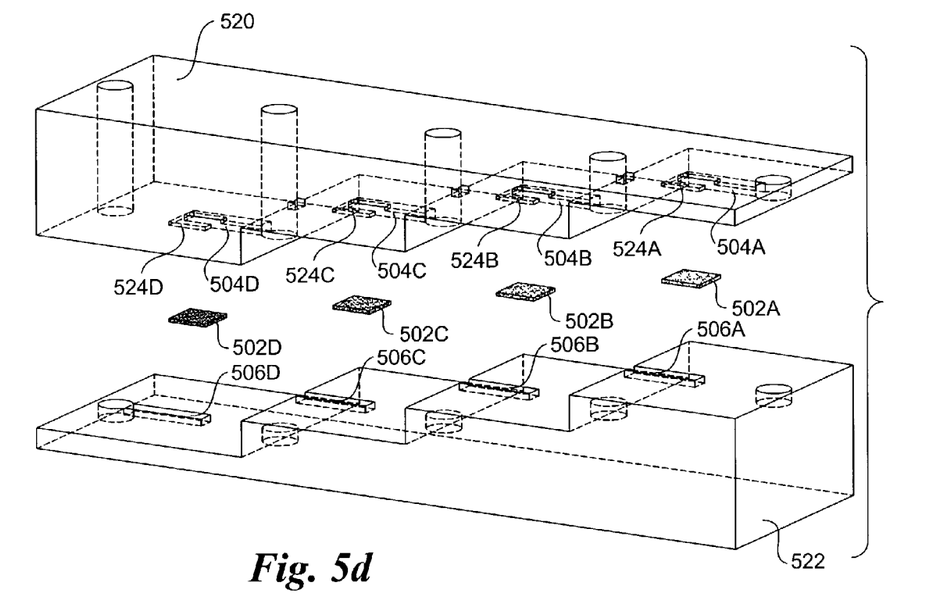
Figure 5E:
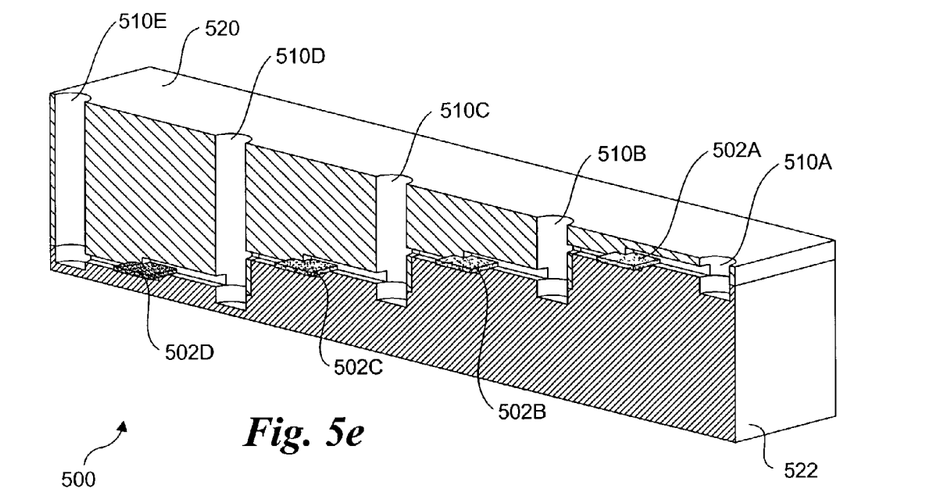
Figure 6A:
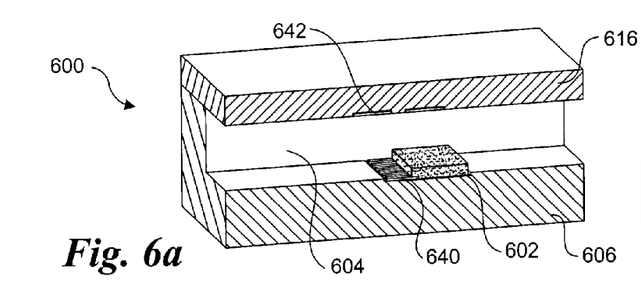
FIGS. 6*a-f* show various cross-section views of a microfluidic channel in which a MEMS hinge actuator is employed to rotate a porous silicon membrane between a pass-through position to a filtering position.
Figure 6B:
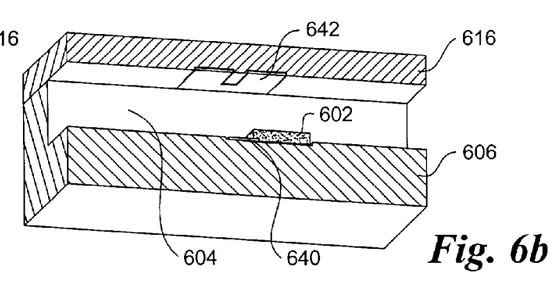
Figure 6C:
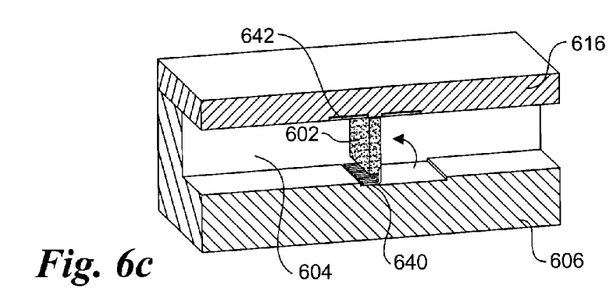
Figure 6D:
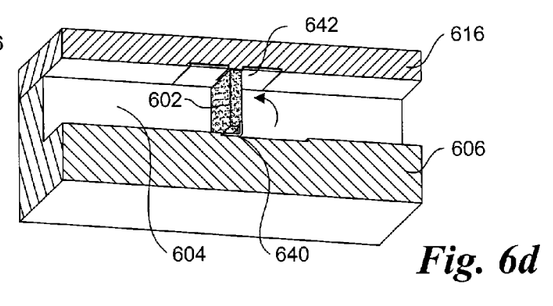
Figure 6E:
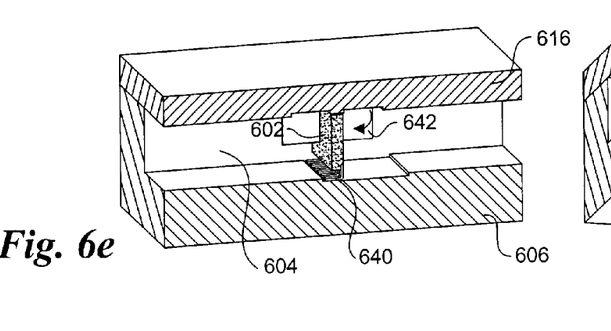
Figure 6F:
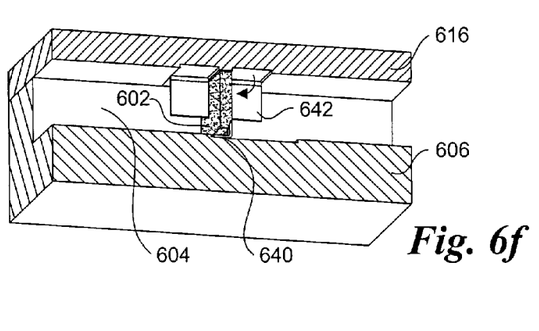

Initial positions of MEMS actuators 640 and 642 are shown in FIGS. 6a and 6b. In FIGS. 6c and 6d, the MEMS hinge actuator 640 is electrically activated, causing porous silicon membrane 602 to be rotated to a vertical "filtering" position, thereby blocking channel 604. In this position, the porous silicon membrane provides a semi-permeable barrier in the manner discussed above with reference to porous membranes 102 and 302. In one embodiment, the porous silicon membrane is rotated until it strikes a stop extending downward from the underside of cover 616 or extending outward from the sides of the channel (both not shown). In the illustrated embodiment, the position of the porous silicon membrane is locked in place via electrical activation of position-locking MEMS actuator 642, as shown in FIGS. 6e and 6f.

In general, MEMS components comprising integrated electromechanical elements or systems having a size corresponding to a nano- or micro-scale. MEMS components may be manufactured using known microfabrication techniques on a common platform, such as a silicon-based or equivalent substrate (e.g., Voldman et al., *Ann. Rev. Biomed. Eng.* 1:401-425, 1999). MEMS components may be fabricated using integrated circuit (IC) process, such as CMOS, Bipolar, or BICMOS processes and the like. They may be patterned using photolithographic and etching methods known for computer chip manufacture. The micromechanical components may be fabricated using compatible "micromachining" processes that selectively etch away parts of the silicon wafer or add new structural layers to form the mechanical and/or electromechanical components. Basic techniques in MEMS manufacture include depositing thin films of material on a substrate, applying a patterned mask on top of the films by photolithographic imaging or other know lithography methods, and selectively etching the films. Deposition techniques of use may include chemical procedures such as chemical vapor deposition (CVD), low pressure chemical vapor deposition (LPCVD), electrodeposition, epitaxy and thermal oxidation, and physical procedures such as physical vapor deposition (PVD) and casting.

Figure 9A:
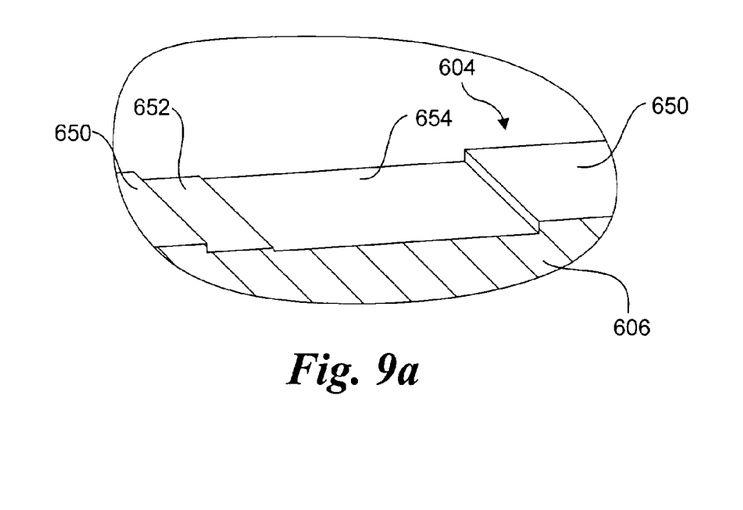
FIGS. 9*a-f* illustrate various process phases corresponding to an operation for manufacturing the MEMS hinge actuator and porous silicon membrane of FIGS. 6*a-f* in accordance with one embodiment of the invention.
Figure 9B:
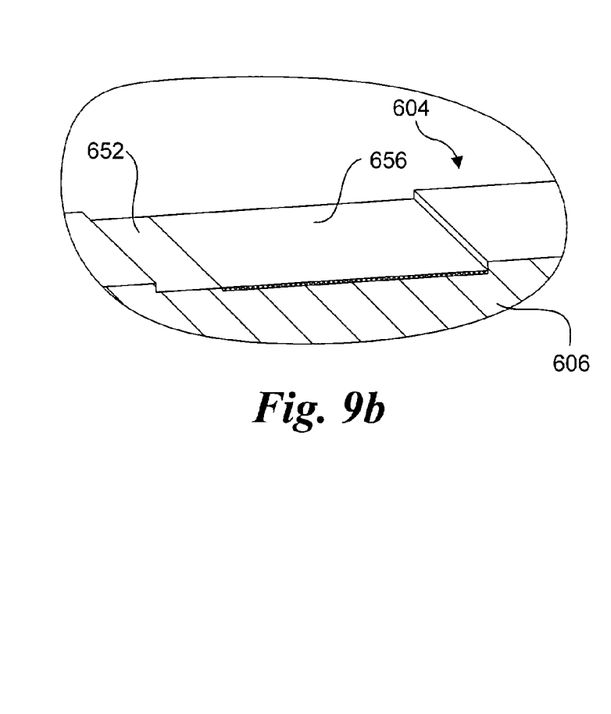

With reference to FIGS. 9a-f, a process for manufacturing the MEMS hinge/porous silicon membrane structure of microfluidic device 600 in accordance with one embodiment of the invention proceeds as follows. Initially, appropriate microfluidic channel portions 604 are formed in a substrate 606, wherein a channel base 650 is depicted in FIG. 9a. Recesses 952 and 954 are then further formed in the substrate. The channels and recesses may be formed using one of various well-known micromachining techniques, as discussed above. Next, as shown in FIG. 9b, a layer of a filler 656 is deposited in recess 954. Preferably, this layer should be made of a material that may be easily etched using an etchant that will have not to minimal affect on the other structural layers.

After the filler has been applied, the MEMS hinge actuator is formed. In one embodiment, a MEMS hinge actuator can be made using a piezoceramic bimorph sandwich configuration. In brief, piezoceramic bimorph sandwich elements are known to be used for actuators that cause the element to bend or otherwise distort. The bimorph sandwich typically contains alternating layers of a conductor and a piezoceramic material. Upon activation of an electrical potential across the sandwich, the piezoceramic layer(s) are caused to expand or contract, while the conductor layers substantially remain unaffected. As a result, the actuator is caused to bend, due to the change in length of the piezoceramic layer(s), in a manner similar to the bending of a bimetallic strip when exposed to varying temperatures.

Figure 9C:
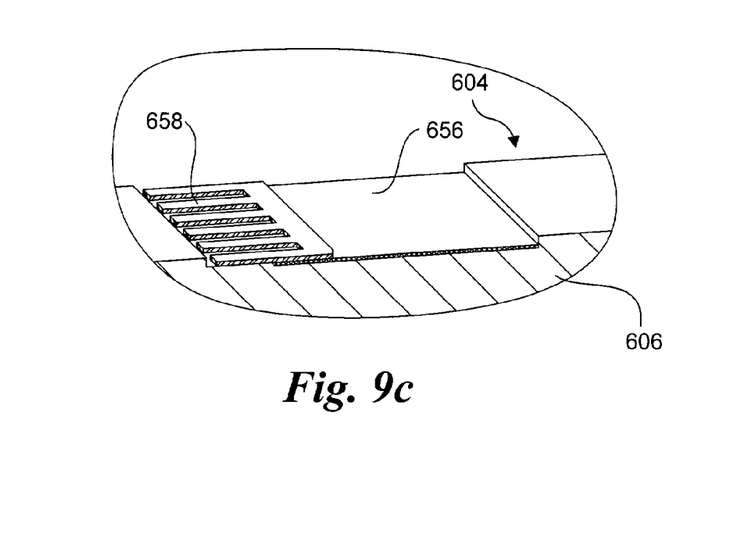
Figure 9D:
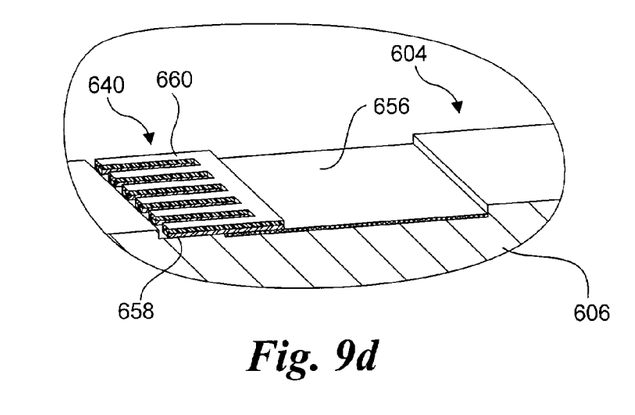

With reference to FIG. 9c, a conductor layer 658 is deposited proximate to recess 652 so as to overlap a portion of filler 956 in a predetermined pattern. The conductor layer may generally comprise one of various metals, such as copper or aluminum. Next, a piezoceramic layer 660 is deposited over conductor layer 658, as shown in FIG. 9d. Depending on the particular characteristic of the bimorph elements used, additional alternating conductor and piezoceramic layers may be added in a similar fashion (not shown). This produces the structure used for MEMS hinge actuator 640.

Figure 9E:
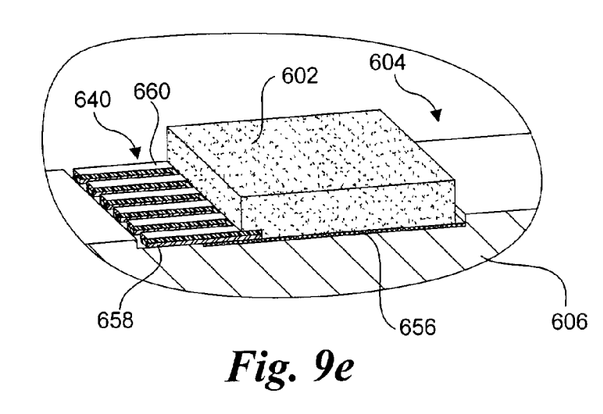
Figure 9F:
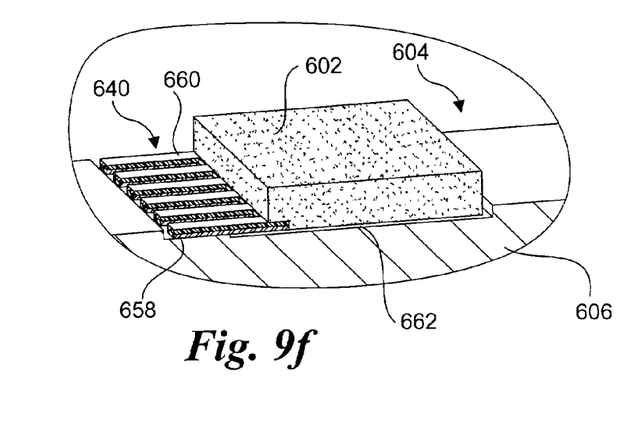

At this point, the porous silicon membrane is formed. In one embodiment, a porous silicon membrane 602 is formed via deposition of polysilicon in accordance with the method for forming nanoporous polysilicon discussed above. The result of this operation is shown in FIG. 9e. The process is completed by etching away filler 656, thereby leaving a void 662 under the porous silicon membrane and a portion of MEMS hinge actuator 640, as shown in FIG. 9f. This frees a portion of the MEMS hinge actuator and the porous silicon membrane from substrate 606, thereby enabling the porous silicon membrane to be rotated upon electrical activation of the MEMS hinge actuator.

Operation of the Embodiments

In general, the various embodiments discussed above will be used for filtering and separating biological and chemical molecules. For example, in microfluidic device 100 (FIGS. 1a-e) an analyte comprising an influent fluid is caused to flow into input channel portion 108, where it encounters an integrated porous silicon membrane 102. As the analyte passes through the porous membrane, smaller molecules are able to pass through the pore matrix faster, leaving the larger molecules trapped longer in the pores of the membrane. This produces a filtered effluent fluid that flows into output reservoir 114, where it may be collected.

A similar process occurs with microfluidic device 200 (FIGS. 2a-e). In this case, an analyte is introduced into upper microfluidic channel 204, and is caused to pass through porous membrane 202. As before, the smaller molecules are able to pass through the pore matrix faster, leaving the larger molecules trapped longer in the membrane pores. The filtered effluent fluid may then be collected from output reservoir 214.

In the cascaded filter approach used in microfluidic devices 300, 400, and 500, the influent fluid is caused to pass through a plurality of porous membranes. As discussed above, in some embodiments that porous membranes will be configured such that the nominal size of the pores of each porous membrane that is encountered by the fluid becomes smaller. The produces a separating effect, wherein the fluid that remains between sequential porous membranes may be selectively filtered to trap a narrow range of molecule sizes. Furthermore, this selectively-filtered fluid may be extracted from the various channel portions (e.g., for microfluidic device 300), or from the reservoirs disposed between the porous membranes (e.g., for microfluidic devices 400 and 500).

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:

1. A microfluidic device, comprising:
    a substrate platform comprising a plurality of cascading microfluidic channels including respective pairs of upper and lower microfluidic channels; and
    a plurality of porous membranes, each disposed between end portions of a respective pair of upper and lower microfluidic channels and comprising a semi-permeable barrier having a plurality of pores to selectively filter an influent fluid that may be introduced in an upper microfluidic channel on an input side thereof to produce a filtered effluent fluid in the lower microfluidic channel on an output side thereof.

2. The microfluidic device of claim 1, wherein each of the plurality of porous membranes are integrally formed from the substrate.

3. The microfluidic device of claim 1, further comprising a cover disposed over at least a portion of the microfluidic channel.

4. The microfluidic device of claim 1, wherein the substrate platform comprises a plurality of substrate layers, each having at least one of an upper microfluidic channel and a lower microfluidic channel formed therein.

5. The microfluidic device of claim 1, wherein the substrate platform comprises an upper and lower substrate member sandwiched around the plurality of porous substrates upon assembly.

6. The microfluidic device of claim 1, further comprising a plurality of reservoirs disposed along a flow path passing along the plurality of cascading microfluidic channels.

7. The microfluidic device of claim 1, wherein the plurality of cascading microfluidic channels are substantially serpentine in configuration.

8. A method for fabricating a microfluidic device of claim 1, comprising:
    forming the plurality of cascading microfluidic channels in a silicon substrate comprising a plurality of channel segments separated by one or more silicon gaps; and
    etching said one or more silicon gaps to form the semi-permeable barrier.

9. The method of claim 8, wherein said one or more silicon gaps are etched using electrochemical etching or stain etching.

10. A microfluidic device, comprising:
    a substrate having a microfluidic channel formed therein; and
    a porous membrane disposed within the microfluidic channel and rotatably coupled to the substrate such that when the porous membrane is rotated to a filtering position it operates as a semi-permeable barrier having a plurality of pores to selectively filter an influent fluid that may be introduced in the microfluidic channel on an input side of the porous membrane to produce a filtered effluent fluid on an output side of the porous membrane, and when the porous membrane is rotated to a pass-through position fluid flowing through the microfluidic channel is enabled to freely bypass the porous membrane.

11. The microfluidic device of claim 10, wherein the porous membrane is hingedly coupled to the substrate via a first Micro-Electro-Mechanical System (MEMS) actuator.

12. The microfluidic device of claim 10, further comprising a cover coupled to the substrate and disposed over at least a portion of the microfluidic channel.

13. The microfluidic device of claim 10, further comprising a second MEMS actuator for locking the porous membrane in the filtering position.

* * * * *